(12) United States Patent
Stockdill et al.

(10) Patent No.: US 12,484,944 B2
(45) Date of Patent: Dec. 2, 2025

(54) SYSTEM AND METHOD FOR INSERTING A FASTENER INTO BONE

(71) Applicant: DePuy Synthes Products, Inc., Raynham, MA (US)

(72) Inventors: Megan Stockdill, West Chester, PA (US); Benjamin Barrall, West Chester, PA (US); Peter Van Citters, West Chester, PA (US)

(73) Assignee: DePuy Synthes Products, Inc., Raynham, MA (US)

( * ) Notice: Subject to any disclaimer, the term of this patent is extended or adjusted under 35 U.S.C. 154(b) by 71 days.

(21) Appl. No.: 18/314,391

(22) Filed: May 9, 2023

(65) Prior Publication Data
US 2023/0270482 A1    Aug. 31, 2023

Related U.S. Application Data

(63) Continuation of application No. 16/660,023, filed on Oct. 22, 2019, now abandoned.

(51) Int. Cl.
*A61B 17/88* (2006.01)
*A61B 17/00* (2006.01)
(Continued)

(52) U.S. Cl.
CPC ...... *A61B 17/8888* (2013.01); *A61B 17/1746* (2013.01); *A61B 17/8057* (2013.01);
(Continued)

(58) Field of Classification Search
CPC ............ A61B 17/8888; A61B 17/1746; A61B 17/8057; A61B 17/8066; A61B 17/90; A61B 2017/00526
See application file for complete search history.

(56) References Cited

U.S. PATENT DOCUMENTS 3,867,932 A    2/1975    Huene
5,429,641 A    7/1995    Gotfried
(Continued)

FOREIGN PATENT DOCUMENTS

EP    2158863 A1    3/2010
EP    2918238 A1    9/2015
(Continued)

OTHER PUBLICATIONS

International Searching Authority, International Search Report and Written Opinion in PCT/IB2020/059111, dated Jan. 19, 2021, filed Sep. 29, 2020.
(Continued)

*Primary Examiner* — Zade Coley
*Assistant Examiner* — Diana Jones
(74) *Attorney, Agent, or Firm* — Dunlap Codding, P.C.

(57) ABSTRACT

An insertion guide for guiding a fastener having a head and a shaft. The insertion guide includes a sidewall constructed of a biocompatible material having an entrance end, an exit end, and a cavity extending from the entrance end to the exit end. The sidewall has a guide portion and a fastener connector portion. The guide portion of the sidewall extends from the entrance end toward the exit end, and the fastener connector portion of the sidewall extends from the exit end toward the guide portion. The sidewall in the guide portion is configured such that the cavity has a first cross-sectional distance greater than the head of the fastener. The sidewall in the fastener connector portion has a second cross-sectional distance greater than the shaft, and less than the head.

20 Claims, 6 Drawing Sheets

(51) Int. Cl.
*A61B 17/17* (2006.01)
*A61B 17/80* (2006.01)
*A61B 17/90* (2006.01)

(52) U.S. Cl.
CPC ............... *A61B 17/8066* (2013.01); *A61B 2017/00526* (2013.01); *A61B 17/90* (2021.08)

(56) References Cited

U.S. PATENT DOCUMENTS

| | | |
|---|---|---|
| 5,605,080 A | 2/1997 | Pfefferle et al. |
| 5,755,721 A | 5/1998 | Hearn |
| 6,187,008 B1 | 2/2001 | Hamman |
| 6,416,518 B1 | 7/2002 | DeMayo |
| 6,916,323 B2 | 7/2005 | Kitchens |
| 7,033,363 B2 | 4/2006 | Powerll |
| 7,357,804 B2 | 4/2008 | Binder, Jr. et al. |
| 7,588,577 B2 | 9/2009 | Fencl et al. |
| 8,282,638 B2 | 10/2012 | Choe et al. |
| 8,945,139 B2 | 2/2015 | Kemper et al. |
| 2013/0150864 A1 | 6/2013 | Marik et al. |
| 2013/0338675 A1 | 12/2013 | Nelson et al. |
| 2014/0100583 A1* | 4/2014 | Butler ............... A61B 17/8875 606/104 |
| 2018/0177510 A1 | 6/2018 | Whitaker et al. |
| 2020/0030015 A1 | 1/2020 | Grizzard et al. |

FOREIGN PATENT DOCUMENTS

| | | |
|---|---|---|
| WO | 9911177 A2 | 3/1999 |
| WO | 2001082804 A1 | 11/2001 |

OTHER PUBLICATIONS

Office Action in U.S. Appl. No. 16/660,023 dated Jun. 28, 2021, filed Oct. 22, 2019.
Response to Office Action in U.S. Appl. No. 16/660,023 dated Aug. 30, 2021, filed Oct. 22, 2019.
Office Action in U.S. Appl. No. 16/660,023 dated Sep. 17, 2021, filed Oct. 22, 2019.
Response to Office Action in U.S. Appl. No. 16/660,023 dated Dec. 7, 2022, filed Oct. 22, 2019.
Final Office Action in U.S. Appl. No. 16/660,023 dated Feb. 9, 2023, filed Oct. 22, 2019.

* cited by examiner

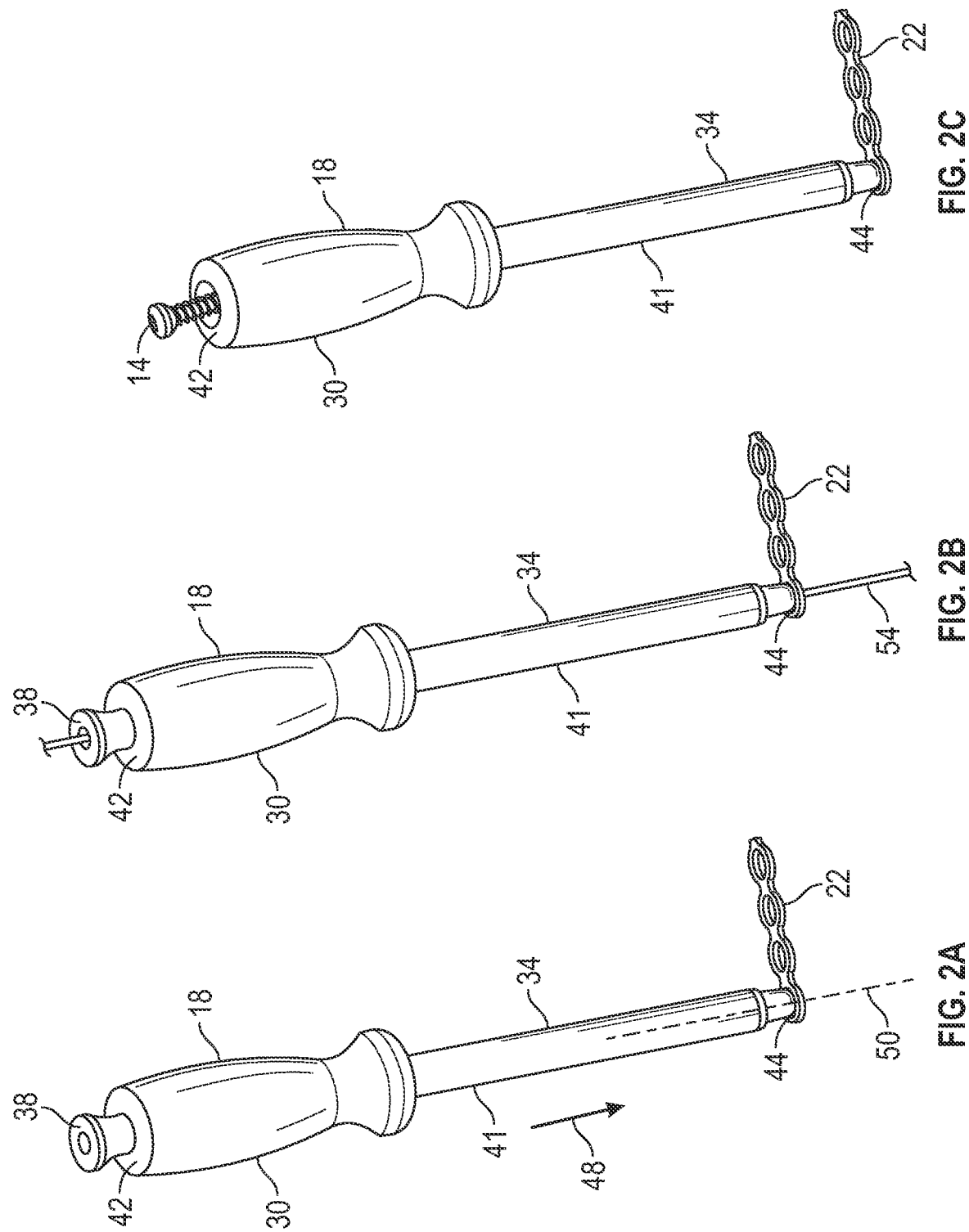

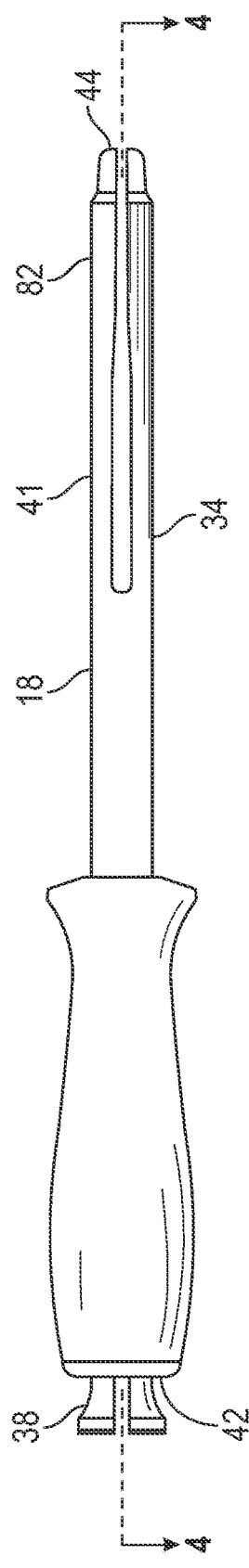
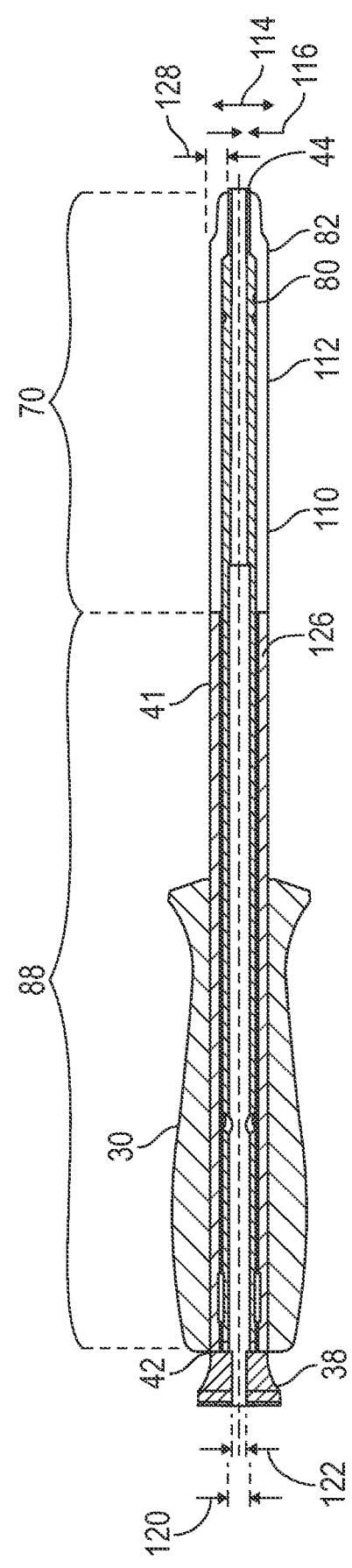
FIG. 3
FIG. 4

SYSTEM AND METHOD FOR INSERTING A FASTENER INTO BONE

CROSS REFERENCE TO RELATED APPLICATIONS/INCORPORATION BY REFERENCE STATEMENT

This application is a continuation of U.S. application Ser. No. 16/660,023, filed Oct. 22, 2019. The entire contents are hereby expressly incorporated herein by reference.

FIELD OF THE DISCLOSURE

The disclosure generally relates to systems and methods for inserting a fastener into bone. In some embodiments, the disclosure relates to an orthopedic fastener inserter for use in repair of acetabular fractures. The orthopedic fastener inserter may permit the user to drill a pilot hole for the fastener and insert the fastener into the pilot hole without losing positional guidance and/or control. The orthopedic fastener inserter may be provided with an insertion guide that has an entrance end, an exit end, and a common cavity for receiving a drill guide to guide a surgical drill to form a pilot hole in the fractured bone and then guiding the fastener into the pilot hole. The exit end of the insertion guide may retain the fastener within the insertion guide and then selectively release the fastener after the fastener has been partially inserted into the bone.

BACKGROUND

The present disclosure relates generally to an improved system and process for fastener insertion during orthopedic surgery, such as acetabular fracture repair, to affix opposed segments of fractured bones, as well as to maintain the broken bones in alignment during the healing process.

In orthopedic surgery, surgical drills, surgical drill guides, wires, and fasteners are often used to assist in the realignment and stabilization of fractured bones. Fasteners may be surgical screws, both threaded and unthreaded, pins, and the like. As can be appreciated by those familiar with realignment and repair of fractured bones, fractured bones are challenging injuries to repair. The desire for consistent placement and insertion of the fastener, compounded with limited visualization of the fractures, the location of the fracture repair, as well as avoiding the infliction of serious injury to the healthy tissue surrounding the fracture has encouraged the development of devices for the placement and insertion of fasteners.

With respect to pelvic reconstruction or stabilization, intra-pelvic fixation of the acetabulum involves approaching a fracture from an incision on the abdomen. As a result, the resulting view of the fracture site can be far away from the surface of the skin. In addition, there are many important organs and vascular structures within the pelvis that must not be damaged. Inserting screws in a deep, angled approach can be a challenge for many pelvic surgeons. To this end, there is a need for an improved orthopedic fastener inserter that protects surrounding tissue, prevents fasteners from being inadvertently misplaced within the patient's body, provides angular guidance, and fastener entry point positional control. It is to such an improved orthopedic fastener inserter that the present disclosure is directed.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIGS. 2A-2E are diagrammatic views of an orthopedic fastener inserter being used to insert a fastener through a fastener hole of a plate and into a bone in accordance with the present disclosure.

FIG. 3 is a side elevational view of an exemplary orthopedic fastener inserter constructed in accordance with the present disclosure.

FIG. 4 is a cross-sectional view of the orthopedic fastener inserter of FIG. 3, taken along the lines 4-4.

DETAILED DESCRIPTION

Figure 1:
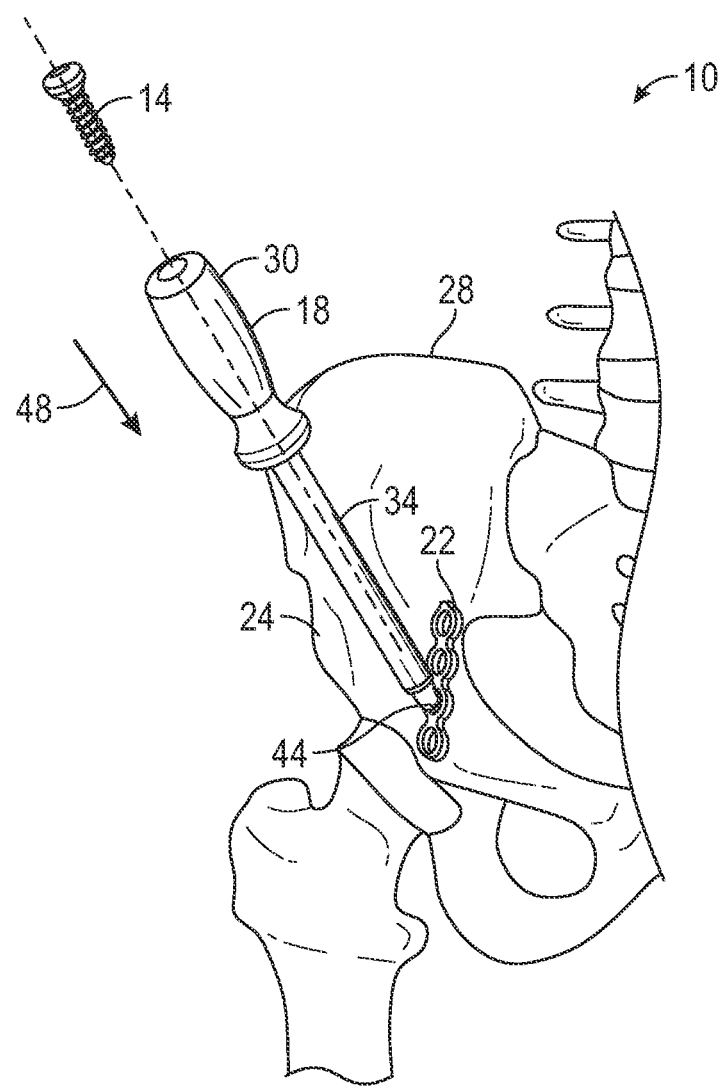
FIG. 1 is a diagrammatic perspective view of an orthopedic assembly constructed in accordance with the present disclosure for securing a reconstruction plate onto an ilium of a pelvis of a patient with a fastener.

Before explaining at least one embodiment of the present disclosure in detail by way of exemplary language and results, it is to be understood that the present disclosure is not limited in its application to the details of construction and the arrangement of the components set forth in the following description. The present disclosure is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the present disclosure shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification. The nomenclatures utilized in connection with, and the medical procedures and techniques of surgery, anesthesia, orthopedics, and trauma repair described herein are those well-known and commonly used in the art. Standard techniques are used for diagnostic and therapeutic applications of the present disclosure.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All the articles, compositions, kits, and/or methods disclosed herein can be made and executed without undue experimentation in light of the present disclosure. While the articles, compositions, kits, and/or methods have been described in terms of particular embodiments, it will be apparent to those of skill in the art that variations may be applied to the articles, compositions, kits, and/or methods and in the steps or in the sequence of steps of the methods described herein without departing from the concept, spirit, and scope of the present disclosure. All such similar substitutes and modifications apparent to those skilled in the art are deemed to be within the spirit, scope, and concept of the present disclosure as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the phrases "associated with" and "coupled to" include both direct association/binding of two moieties (or assemblies, mechanisms, or components and the like) to one another as well as indirect association/binding of two moieties (or assemblies, mechanisms, or components and the like) to one another. Non-limiting examples of associations/couplings include covalent binding of one moiety (or assemblies, mechanisms, or components and the like) to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety, for example. Additionally, physical couplings and/or mechanical couplings could be used for the direct or indirect association/binding of two moieties (or assemblies, mechanisms, or components and the like) to one another.

As used herein, the term "patient" or "subject" is meant to include all organisms, whether alive or dead, including any species having soft tissues and bones. For example, a method according to the inventive concepts disclosed herein may be used to introduce a screw to a plate within a living/dead human, horse, cow, sheep, cat, dog, and the like.

In one embodiment, the present disclosure describes an insertion guide for guiding a fastener comprising a shaft having a first diameter, and a head connected to the shaft, the head having a second diameter greater than the first diameter so that the head extends outwardly from the shaft. The insertion guide is provided with a sidewall constructed of a biocompatible material having an entrance end, an exit end, and a cavity extending from the entrance end to the exit end. The sidewall has a guide portion and a fastener connector portion. The guide portion of the sidewall extends from the entrance end toward the exit end, and the fastener connector portion of the sidewall extends from the exit end toward the guide portion. The sidewall in the guide portion is configured such that the cavity has a first cross-sectional distance greater than the second diameter of the head of the fastener. The sidewall in the fastener connector portion has a second cross-sectional distance greater than the first diameter of the shaft, and less than the second diameter of the head.

In some of the presently disclosed non-limiting embodiments, the fastener connector portion of the sidewall is a collet having a plurality of fingers defining the cavity at the exit end of the sidewall. The fingers are constructed of a spring-like material so as to be movable outwardly from a resting position to an expanded position, and movable inwardly from the expanded position to the resting position. When the fingers are in the expanded position, the cavity has a third cross-sectional distance greater than the second diameter of the head. The fingers of the fastener connector portion of the sidewall include a first finger and a second finger. The first finger has a first side and a second side. The second finger has a third side and a fourth side. The first side of the first finger and the fourth side of the second finger define a slot.

In some of the presently disclosed non-limiting embodiments, the cavity includes a fastener connector portion cavity located within the fastener connector portion of the sidewall. The fingers of the fastener connector portion of the sidewall include a first finger, a second finger, and a third finger positioned around the fastener connector portion cavity, the fastener connector portion cavity having the first cross-sectional distance and the second cross-sectional distance.

In some of the presently disclosed non-limiting embodiments, the second cross-sectional distance is defined by the sidewall when the fingers are in the resting position.

In some of the presently disclosed non-limiting embodiments, the fastener connector portion includes a protrusion extending inwardly into the cavity such that the protrusion alters a distance across the cavity from the first cross-sectional distance to the second cross-sectional distance. The shaft of the fastener may have a first length, and the protrusion has a proximal end, a distal end, and a second length extending between the proximal end and the distal end, and wherein the second length is less than the first length.

In some of the presently disclosed non-limiting embodiments, the sidewall at the proximal end of the protrusion has a first width, and the second length of the protrusion has a second width, and wherein the second width is less than the first width.

In some of the presently disclosed non-limiting embodiments, the exit end of the sidewall is configured to be a tapered end.

In some of the presently disclosed non-limiting embodiments, the exit end has a plurality of threads.

In some of the presently disclosed non-limiting embodiments, the sidewall has an interior surface extending between the entrance end and the exit end, the interior surface defining the cavity, and an exterior surface spaced outwardly from the interior surface. The exterior surface extends from the entrance end to the exit end. The sidewall has a first thickness extending between the interior surface and the exterior surface in the guide portion, and a second thickness extending between the interior surface and the exterior surface in the fastener connector portion of the sidewall. In one embodiment, the second thickness is greater than the first thickness. In an alternative embodiment, the second thickness is the same or less than the first thickness In some of the presently disclosed non-limiting embodiments, a method of making an insertion guide is described. In these embodiments, a sidewall having an entrance end, and an exit end is formed such that a cavity is defined by an interior surface of the sidewall and extends from the entrance end to the exit end. The sidewall has a guide portion and a fastener connector portion. The guide portion of the sidewall extends from the entrance end toward the exit end. The fastener connector portion of the sidewall extends from the exit end toward the guide portion. The sidewall in the guide portion is configured such that the cavity has a first cross-sectional distance, and the sidewall in the fastener connector portion has a second cross-sectional distance less than the first cross-sectional distance.

In some of the presently disclosed non-limiting embodiments, forming the sidewall is defined further as forming the fastener connector portion as a collet having a plurality of fingers defining the cavity at the exit end of the sidewall. The fingers being constructed of a spring-like material so as to be movable outwardly from a resting position to an expanded position, and movable inwardly from the expanded position to the resting position.

In some of the presently disclosed non-limiting embodiments, forming the plurality of fingers of the sidewall of the fastener connector portion is defined further as forming the fastener connector portion with a first finger and a second finger, the first finger having a first side and a second side, the second finger having a third side and a fourth side, the first side of the first finger and the fourth side of the second finger defining a slot.

In some of the presently disclosed non-limiting embodiments, the cavity includes a fastener connector portion cavity located within the fastener connector portion of the sidewall, the plurality of fingers of the fastener connector portion of the sidewall includes a first finger, a second finger, and a third finger positioned around the fastener connector portion cavity, the fastener connector portion cavity having the first cross-sectional distance and the second cross-sectional distance.

In some of the presently disclosed non-limiting embodiments, the second cross-sectional distance of the sidewall is when the plurality of fingers of the collet are in the resting position.

In some of the presently disclosed non-limiting embodiments, forming the fastener connector portion is defined further as forming the fastener connector portion with a protrusion extending inwardly into the cavity such that the protrusion alters a distance across the cavity from the first cross-sectional distance to the second cross-sectional distance.

In some of the presently disclosed non-limiting embodiments, forming the exit end is defined further as forming the exit end of the sidewall to have a tapered end.

In some of the presently disclosed non-limiting embodiments, forming the exit end of the insertion guide is defined further as having a plurality of threads.

In some of the presently disclosed non-limiting embodiments, forming the sidewall is defined further as forming the sidewall having the interior surface extending between the entrance end and the exit end, the interior surface defining the cavity, and an exterior surface spaced outwardly from the interior surface, the exterior surface extending from the entrance end to the exit end, the sidewall having a first thickness extending between the interior surface and the exterior surface in the guide portion, and a second thickness extending between the interior surface and the exterior surface in the fastener connector portion of the sidewall, the second thickness being greater than the first thickness.

In some of the presently disclosed non-limiting embodiments, a method is described in which an insertion guide is placed through an incision within a patient until an exit end of the insertion guide is positioned adjacent to a bone of the patient. A fastener is inserted into a cavity of the insertion guide, and a surgical screwdriver is inserted into the cavity of the insertion guide until the surgical screwdriver engages a head of the fastener. The fastener is partially applied into the bone with the surgical screwdriver until a fastener connector portion of the insertion guide engages the head of the fastener. The fastener is released from the insertion guide, and the surgical screwdriver is used to fully insert the fastener into the bone.

Referring now to the drawings, FIG. 1 generally illustrates an exemplary diagrammatic view of an orthopedic assembly 10 constructed in accordance with the present disclosure. The orthopedic assembly 10 includes a plurality of fasteners 14 (only one being shown in FIG. 1 for purposes of clarity), an orthopedic fastener inserter 18, and a reconstruction plate 22. The orthopedic assembly 10 is shown in FIG. 1 by way of example as being used to reconstruct an acetabular joint 28 of a patient. The reconstruction plate 22 extends across a portion of the pelvic brim 24 and is secured to the pelvic brim 24 with the plurality of fasteners 14. The orthopedic fastener inserter 18 may be used to insert the fasteners 14, one at a time, into the pelvic brim 24 (or other part of the pelvis 28) to thereby secure the reconstruction plate 22 to the pelvic brim 24. Although the orthopedic fastener inserter 18 will be described herein by way of example for assisting in reconstruction of the pelvis 28, it should be understood that the orthopedic fastener inserter 18 can be used for inserting one or more fastener 14 into any bone within the patient. For this reason, the orthopedic fastener inserter 18 can be made in various sizes to be used with a variety of different types of fasteners 14.

In general, the orthopedic fastener inserter 18 includes a handle 30 connected to an insertion guide 34, and a drill guide 38 (see FIG. 2A) removably positioned within the insertion guide 34. In one embodiment, the handle of the orthopedic fastener inserter 18 may be attached to the insertion guide 34, and generally aligned with the drill guide 38 and the insertion guide 34. In other embodiments, (not shown) the handle 30 of the orthopedic fastener inserter 18 may be offset from the insertion guide 34. The handle 30 may be comprised of any suitable material that can be sterilized, and gripped by a surgeon. Suitable materials for making the handle 30 include metal, plastic, or silicone.

The reconstruction plate 22 has a variety of fastener holes 40 that are used to receive the fasteners 14 and thereby secure the reconstruction plate 22 onto the pelvic brim 24. In use, the reconstruction plate 22 is positioned on the pelvic brim 24 (or other bone within the patient) and is secured to the pelvic brim 24 by passing the plurality of fasteners 14 through the respective fastener holes 40 in the reconstruction plate 22 and into the pelvic brim 24. To assist in forming a pilot hole, the drill guide 38 may be positioned within the insertion guide 34. In some embodiments, the drill guide 38 and the insertion guide 34 may be provided in a telescopically nested configuration. When the fastener 14 is self-drilling, the drill guide 38 may or may not be used. In the example described herein, the fastener 14 is a non-self-drilling screw and the drill guide 38 is positioned telescopically within the insertion guide 34.

FIGS. 2A-2E are diagrammatic views of the orthopedic fastener inserter 18 being used to insert the fastener 18 through the fastener hole 40 of the reconstruction plate 22. The reconstruction plate 22 shown in FIGS. 2A-2D is smaller than the reconstruction plate 22 shown in FIG. 1 for purposes of clarity. The pelvic brim 24 is also not shown in FIGS. 2A-2E for purposes of clarity.

The insertion guide 34 includes a sidewall 41 having an entrance end 42 and an exit end 44. The sidewall 41 may have a length between the entrance end 42 and the exit end 44 in a range from about 30 mm to about 400 mm. In use, a surgeon grips the handle 30 and guides the exit end 44 of the insertion guide 34 through an incision within the patient's skin, past the patient's tissue/organs until the exit end 44 of the insertion guide 34 is placed partially within a particular fastener hole 40 in the reconstruction plate 22. In some embodiments, the exit end 44 of the insertion guide 34 is sized and configured so as to extend partially within the fastener hole 40 without the exit end 44 touching the pelvic brim 24. In this position, a mating force is applied in a direction 48 toward the reconstruction plate 22 to maintain the exit end 44 of the insertion guide 34 in the fastener hole 40. The insertion guide 34 has a longitudinal axis 50 as shown in FIG. 2A. The angle of the longitudinal axis 50 relative to the reconstruction plate 22 can be adjusted by moving the location of the handle 30 relative to the exit end 44. When a desired angle is achieved, as shown in FIG. 2B, a drill bit 54 is inserted through the drill guide 38 and is used to drill a pilot hole within the pelvic brim 24. The drill bit 54 and the drill guide 38 are removed from the insertion guide 34 while the mating force is maintained in the direction 48 toward the reconstruction plate 22, and one of the fasteners 14 is placed within the entrance end 42 and conveyed to the exit end 44 by the sidewall 41 by gravity, for example.

Figure 2D:
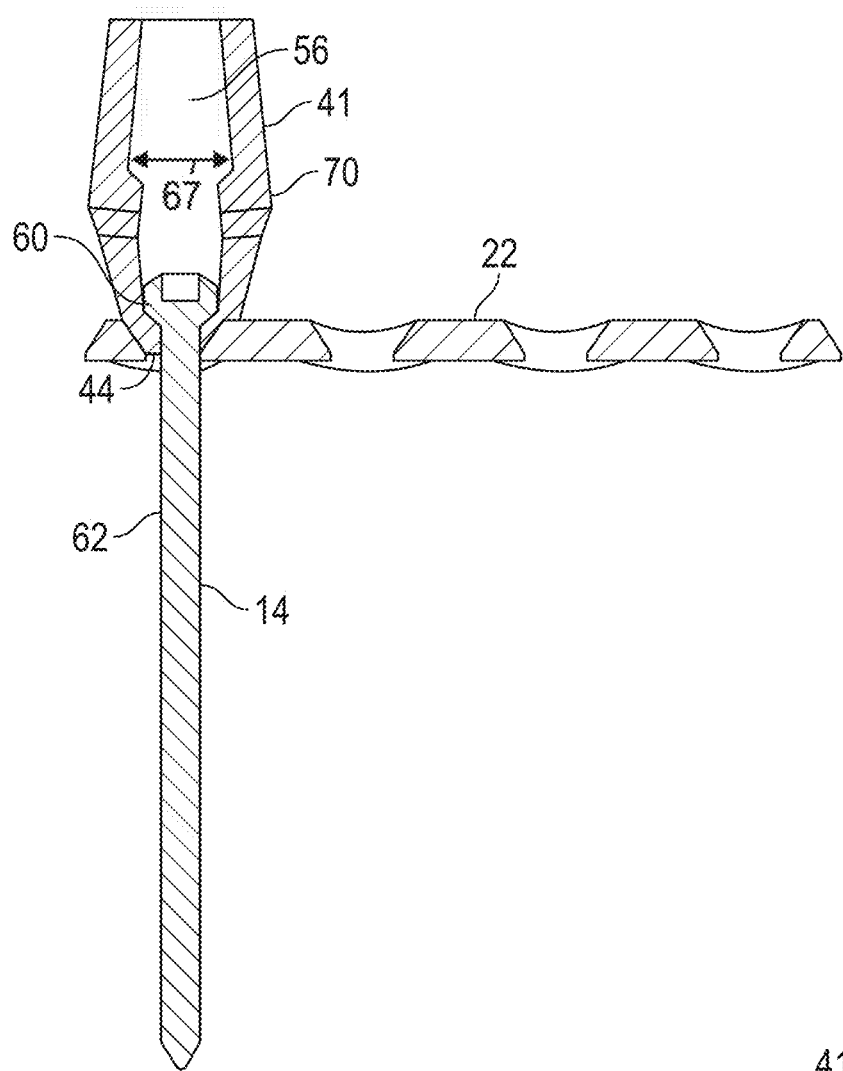
Figure 2E:
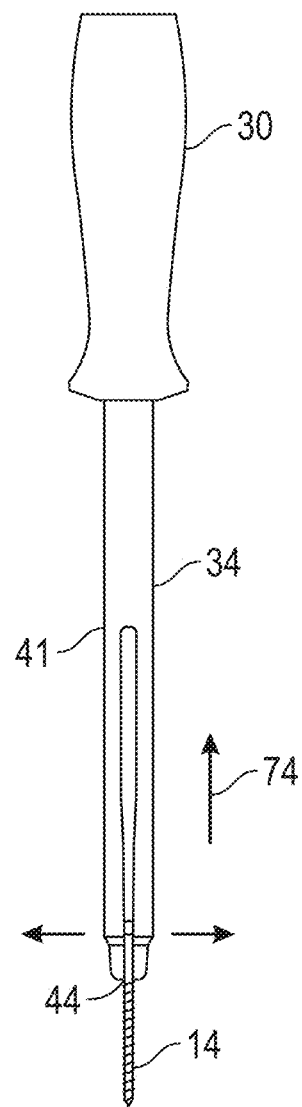

As shown in FIG. 2D, a surgical screwdriver 56 is placed through the entrance end 42, engages and rotates the fastener 14 to apply the fastener 14 into the pilot hole. The fastener 14 includes a head 60 and a shaft 62 extending from the head 60. The shaft 62 has a first diameter 64 and the head 60 has a second diameter 66 greater than the first diameter 64. The insertion guide 34 includes a fastener connector portion 70 that serves to selectively retain the fastener 14 within the insertion guide 34 thereby reducing a possibility of the fastener 14 being misplaced during surgery. The fastener connector portion 70 is sized and dimensioned to permit the shaft 62 to pass through the exit end 44. With respect to the head 60, however, the fastener connector portion 70 engages the head 60 of the fastener 14 to prevent the head 60 from inadvertently passing through the exit end 44. After the fastener 14 has been driven into the pilot hole until the head 60 engages the fastener connector portion 70, the surgeon can apply a removal force to the handle 30 for removing the fastener connector portion 70 from the head 60 and thereby removing the insertion guide 34 from the fastener 14. In some cases, the removal force can be applied in a direction 74 generally opposite the direction 48 resulting in portions of the fastener connector portion 70 moving outwardly, thereby releasing the head 60 and permitting the head 60 to pass through the exit end 44. The surgical screwdriver 56 may then be used to fully apply the fastener 14 into the pelvic brim 24.

In one embodiment the fastener 14 may be a screw. For example, the fastener 14 may be a self-drilling screw, a non-self-drilling screw, a self-tapping screw, a non-self-tapping screw and combinations thereof. The fastener 14 may be a cortex screw or a cannulated screw. Further, the head 60 of the fastener 14 may be a locking head, or a non-locking head. The head 60 may be shaped as a conically shaped head, a spherically shaped head or be shaped in other manners. In one embodiment, the shaft 62 of the fastener 14 may be at least partially threaded. In another embodiment, the fastener 14 may be a pin. The fastener 14 may be constructed of any suitable biocompatible material, such as titanium, titanium allow, or stainless steel. In some embodiments, the fastener can be a polyaxial bone screw. Exemplary polyaxial screws are described in U.S. Pat. No. 10,136,924, which disclosure is incorporated herein by reference.

In some embodiments, pelvic osteosyntheses can be carried out using fasteners 14 alone. But, in many cases for a proper reconstruction, the fasteners 14 should be accompanied with one or more of the reconstruction plates 22. The reconstruction plate 22 can be constructed in a variety of configurations. For example, the reconstruction plate 22 can be a linear shaped plate, a curved plate, and combinations thereof. The reconstruction plate 22 can also be a locking plate, or a non-locking plate. In some embodiments, the fastener holes 40 within the reconstruction plate 22 are designed to permit the fasteners 14 to be secured at a variety of angles. In some cases the fasteners 14 can be angled up to about 30 degrees from normal. In some embodiments, the reconstruction plate 22 can be a pubic symphysis plate configured to fit an anatomy of the pubic symphysis. In other embodiments, the reconstruction plate 22 can be a convex shaped spring plate configured to reduce and stabilize small bone fragments that are too small for screws. The reconstruction plate 22 can be constructed of any suitable biocompatible material, such as titanium, titanium alloy, or stainless steel.

Referring now to FIGS. 3 and 4, the construction of the orthopedic fastener inserter 18 is shown in more detail. In particular, FIG. 3 is a side-elevational view of the orthopedic fastener inserter 18 having the drill guide 38 positioned within the insertion guide 34. FIG. 4 is a cross-sectional view of the orthopedic fastener inserter 18 taken along the lines 4-4 depicted in FIG. 3.

Figure 7:
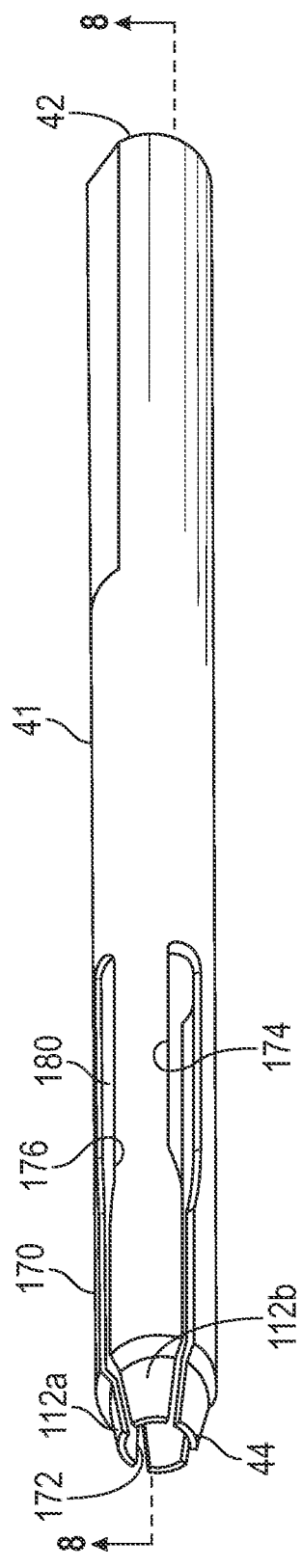
FIG. 7 is a perspective view of an exemplary insertion guide of the orthopedic fastener inserter depicted in FIG. 3.
Figure 8:
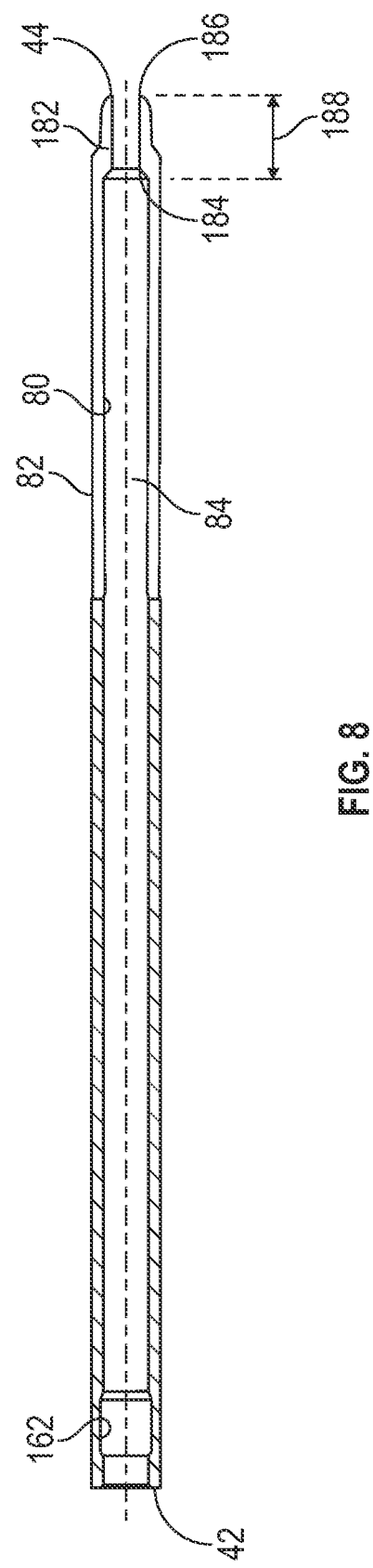
FIG. 8 is a cross-sectional view of the insertion guide of FIG. 7 taken along the lines 8-8 depicted in FIG. 7.

As discussed above, the insertion guide 34 includes the sidewall 41. The sidewall 41 includes the entrance end 42, and the exit end 44. The sidewall 41 also has an interior surface 80 (FIG. 4) and an exterior surface 82. As shown in FIG. 4, the interior surface 80 of the sidewall 41 defines a cavity 84 (see FIG. 8) extending from the entrance end 42 to the exit end 44. As shown in FIG. 3, the sidewall 41 of the insertion guide 34 also has a guide portion 88, and the fastener connector portion 70. The guide portion 88 of the sidewall 41 extends from the entrance end 42 of the sidewall 41 towards the exit end 44 of the sidewall 41. An exterior view of the fastener connector portion 70 of the orthopedic fastener inserter 18 is shown in FIGS. 3 and 7. An interior view of the fastener connector portion 70 is shown in FIGS. 4 and 8.

Referring again to FIG. 3, the fastener connector portion 70 of the sidewall 41 of the insertion guide 34 can be a collet 110 having a plurality of fingers 112. Two of the fingers 112 are labeled in FIG. 7 with the reference numerals 112a and 112b for purposes of clarity. The fingers 112 of the collet 110 may be constructed of a spring-like material so as to be movable in directions 114 outwardly from a resting position (shown in FIGS. 3, 4, 7 and 8) to an expanded position (not shown), and movable inwardly in directions 116 from the expanded position to the resting position. In the resting position, the fingers 112 prevent the head 60 of the fastener 14 from exiting the exit end 44 of the sidewall 41. In the expanded position, the fingers 112 permit the head 60 of the fastener 14 to exit the exit end 44 of the sidewall. When the fingers 112 of the collet 110 are in the expanded position, the cavity 84 at the exit end 44 has a third cross-sectional distance 67 greater than the second diameter 66 of the head 60.

As shown in FIG. 4, the sidewall 41 is configured such that the cavity 84 has a first cross-sectional distance 120 in the guide portion 88, and a second cross-sectional distance 122 in the fastener connector portion 70. The first cross-sectional distance 120 can be within a range from about 1 mm to about 20 mm. The first cross-sectional distance 120 is greater than the second diameter 66 of the head 60 of the fastener 14. The second cross-sectional distance 122 is greater than the first diameter 64 of the shaft 62, and less than the second diameter 66 of the head 60. The guide portion 88 of the sidewall 41 has a first thickness 126. The first thickness 126 extends between the interior surface 80 of the sidewall 41 of the guide portion 88 and the exterior surface 82 of the sidewall 41 of the guide portion 88. The fastener connector portion 70 of the sidewall 41 has a second thickness 128. The second thickness 128 of the sidewall 41 extends between the interior surface 80 of the sidewall 41 of the fastener connector portion 70 and the exterior surface 82 of the sidewall 41 of the fastener connector portion 70. The second thickness 128 of the sidewall 41 is greater than the first thickness 126 of the sidewall 41.

Referring to FIG. 3, the cavity 84 of the insertion guide 34 may be configured to receive the drill guide 38.

Figure 5:
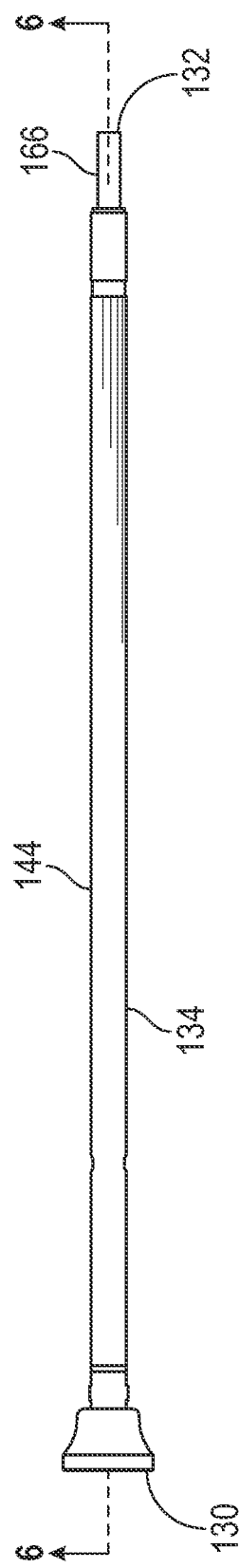
FIG. 5 is a side elevational view of an exemplary drill guide of the orthopedic fastener inserter of FIG. 3.
Figure 6:
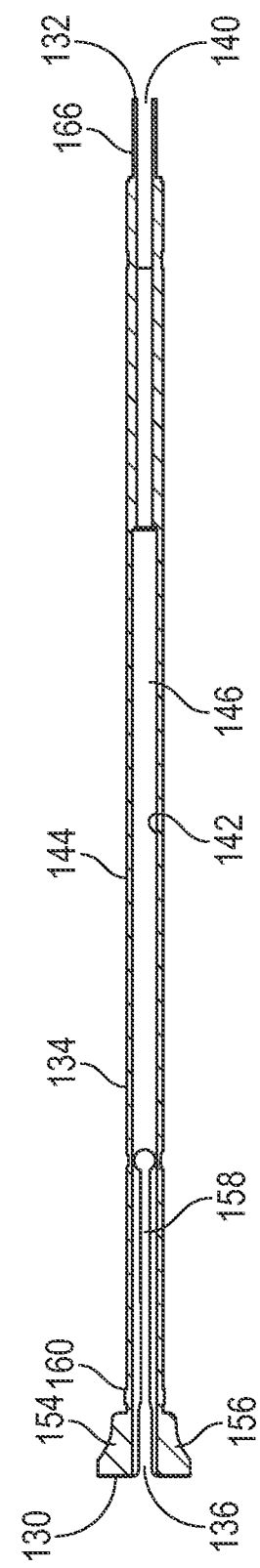
FIG. 6 is a cross-sectional view of the drill guide of FIG. 5 taken along the lines 6-6.

The drill guide 38 is shown in more detail in FIGS. 5 and 6. FIG. 5 is a side elevation view of the drill guide 38. FIG. 6 is a cross-sectional view of the drill guide 38 taken along the lines 6-6 depicted in FIG. 5. The drill guide 38 has a first end 130, a second end 132, and a second sidewall 134 extending between the first end 130 and the second end 132. The first end 130 of the drill guide 38 has an opening 136 with a third diameter 137 sized and configured to receive the drill bit 54. The second end 132 of the drill guide 38 has an opening 140 sized and configured to permit the drill bit 54 to exit the sidewall 134. The sidewall 134 of the drill guide 38 has an interior surface 142 and an exterior surface 144. The interior surface 142 of the sidewall 134 forms a cavity 146 sized and configured to matingly receive and pass the drill bit 54. As discussed above, the drill guide 38 can be telescopingly positioned in and removed from the cavity 84 of the insertion guide 34. The drill guide 38 may be configured to removably lock into the insertion guide 34. For example, in the embodiment depicted, the first end 130 is provided with two tabs 154 and 156. The sidewall 134 is provided with two slots 158 extending from the first end 130 toward the second end 132. The slots 158 permit the tabs 154 and 156 to be moved together and apart. The material forming the sidewall 134 may be a spring-like material that biases the tabs 154 apart. The sidewall 134 may be provided with one or more protrusion 160 on the exterior surface 144 that mates with a corresponding recess 162 (see FIG. 8) within the interior surface 80 of the insertion guide 34. To insert or remove the drill guide 38 from the insertion guide 34, the tabs 154 and 156 are pinched together to remove the protrusion 160 from the recess 162. Then, the drill guide 38 is either inserted into the insertion guide 34 or removed from the insertion guide 34.

As shown in FIGS. 5 and 6, the sidewall 134 has a tip 166 extending from the second end 132 towards the first end 130. The tip 166 has a reduced diameter, as compared with the remainder of the sidewall 134. In particular, the interior surface 142 is generally uniform in cross-sectional dimension throughout the sidewall 134, including within the tip 166, to permit passage of the drill bit 54 through the drill guide 38. The exterior surface 144, however, is necked down near the second end 132 to form the tip 166 such that a thickness of the sidewall 134 in the tip 166 is reduced as compared with a thickness of the sidewall 134 adjacent to the tip 166.

The drill bit 54 may be inserted into the opening 136 of the first end 130 of the drill guide 38. The drill bit 54 may extend through the cavity 146 of the drill guide 38 and through the opening 140 in the second end 132 of the drill guide 38. The drill bit 54 is guided by the drill guide 38, through the insertion guide 34 to drill the pilot hole into the ilium 24 or other bone. Once the pilot hole has been drilled by the drill bit 54, the drill bit 54 and the drill guide 38 are removed from the cavity 84 of the insertion guide 34. The drill guide 38 may be constructed of titanium, titanium alloy, stainless steel, or the like.

Shown in FIG. 7 is a perspective view of the exit end 44 of the insertion guide 34. The plurality of fingers 112 of the fastener connector portion 70 of the sidewall 41 include the finger 112a and the finger 112b. The finger 112a has a first side 170 and a second side 172. The second finger 112b has a third side 174 and a fourth side 176. The first side 170 of the first finger 112a and the fourth side 176 of the second finger 112b are spaced apart to define a slot 180. The other fingers 112 of the plurality of fingers 112 can be constructed in a similar manner as the finger 112a and the finger 112b. In the example shown, the insertion guide 34 is provided with four fingers 112, although more or less fingers 112 can be provided. The fingers 112 can be formed in the sidewall 41 by creating multiple slots 180 within the sidewall 41. Each of the slots 180 extend from the exit end 44 toward the entrance end 42, but do not intersect the entrance end 42. The plurality of fingers 112 of the sidewall 41 of the fastener connector portion 70 are positioned around the cavity 84 of the fastener connector portion 70.

Referring to FIG. 8, the sidewall 41 includes a protrusion 182 extending into the cavity 84 adjacent to the exit end 44. The protrusion 182 of the fastener connector portion 70 decreases a distance across the cavity 84 so as to prevent the head 60 of the fastener 14 from inadvertently passing through the exit end 44. The exit end 44 is sidewall 41 is sized and shape to allow the exit end 44 to articulate within the fastener holes 40 of the reconstruction plate 22. For example, the exit end 44 can be provided with a tapered and/or a rounded profile. The protrusion 182 has a proximal end 184, a distal end 186, and a length 188 extending between the proximal end 184 and the distal end 186. The length 188 is less than a length of the shaft 62 so that the shaft 62 can be driven into the pilot hole in the bone.

To use the orthopedic fastener inserter 18 to insert the fastener 14 into the bone, the orthopedic fastener inserter 18 is inserted into an incision of a patient. The orthopedic fastener inserter 18 is advanced through the incision of the patient until the exit end 44 of the insertion guide 34 of the orthopedic fastener inserter 18 engages or connects with the reconstruction plate 22 overlying a portion of bone. In some embodiments, the exit end 44 of the insertion guide 34 of the orthopedic fastener inserter 18 is adapted to mate with a portion of the reconstruction plate 22 adjacent to the fastener hole 40 to establish a predetermined alignment between the insertion guide 34 and the reconstruction plate 22. This alignment can be accomplished with threads, snaps or the like.

Once the exit end 44 of the insertion guide 34 of the orthopedic fastener inserter 18 is aligned and/or engaged with the reconstruction plate 22, the drill guide 38 may be inserted into the cavity 84 of the insertion guide 34. In another embodiment, the drill guide 38 may be inserted into the cavity 84 of the insertion guide 34 prior to the insertion of the orthopedic fastener inserter 18 into the patient. Once the drill guide 38 has been inserted into the cavity 84 of the insertion guide 34, the drill bit 54 may be inserted into the opening 136 of the first end 130 of the drill guide 38. The drill bit 54 may extend through the cavity 146 of the drill guide 38 and through the opening 140 in the second end 132 of the drill guide 38. The drill bit 54 is guided by the drill guide 38, through the cavity 84 of the insertion guide 34. The drill bit 54 is used to form a pilot hole into the bone, such as the ilium 24. After drilling the pilot hole, the drill bit 54 may be removed from the drill guide 38, and the drill guide 38 may be removed from the cavity 84 of the insertion guide 34.

The drill guide 38 may be unfastened from the interior surface 80 of the cavity 84 by the application of force to the tabs 154 thereby releasing the protrusion 160 from the recess 162.

The fastener 14 is then placed into the cavity 84 of the insertion guide 34 of the orthopedic fastener inserter 18 through the entrance end 42. Gravity may cause the fastener 14 to slidingly move toward the exit end 44 of the insertion guide 34 of the orthopedic fastener inserter until the shaft 62 of the fastener 14 extends through the exit end 44 and contacts the bone.

The surgical screwdriver 56 is inserted through the entrance end 42 of the insertion guide 34 of the orthopedic fastener inserter 18 into the cavity 84. The surgical screwdriver 56 engages the head 60 of the fastener 14. The surgical screwdriver 56 may substantially insert the shaft 62 of the fastener 14 into the bone until the head 60 of the fastener 14 engages the protrusion 182. Then, the surgical screwdriver 56 is removed from the insertion guide 34, and the insertion guide 34 is removed from the fastener 14 by application of the removal force in the direction 74 causing the fingers 112 of the collet 110 to expand outwardly. The surgical screwdriver 56 is reinserted into the incision of the patient to engage the head 60 and complete the insertion of the fastener 14 into the bone. This process can then be repeated for inserting additional fasteners 14 into the bone.

Forming the insertion guide 34 may include the creation and assembly of a plurality of components which could be created through various forms of casting, such as lost wax casting, centrifugal casting, die casting, sand casting, shell casting and spin casting; or bulk metal forming such as cold sizing, extrusion, drawing, forging, powder metallurgy, friction drilling, rolling and burnishing. The components may be joined by welding, brazing, soldering, or other processes known to those of ordinary skill in the art. The insertion guide 34 may also be formed as a unitary structure, and the fingers 112 cut using an electrical discharge machining (EDM) process.

The insertion guide 34 of the orthopedic fastener inserter 18 may be created by the initial creation of a tube having common dimensions. The various processes for forming the tube may include but are not limited to bending, coining, deep drawing, flow forming, hydroforming, turning, hot metal gas forming, incremental forming, spinning, stamping, gun drilling/deep drilling, or other methods known to those of ordinary skill in the art.

The plurality of fingers 112 of the collet 110 can be formed by cutting the slots 180 using any suitable medium, such as a laser, a wire electrical discharge machining process, a water jet, plasma, milling, or sheering, or other methods known to persons of ordinary skill in the art.

In some embodiments, the handle, the drill guide 38 and/or the insertion guide 34 can be formed using a three dimensional printing process.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. An insertion guide assembly for guiding fasteners one at a time into bone, the insertion guide assembly comprising:
   an insertion guide having a sidewall extending between an entrance end and an exit end, and a cavity extending from the entrance end to the exit end, the cavity at the entrance end having a first cross sectional distance greater than a diameter of a head of a fastener, the sidewall at exit end having a second cross sectional distance less than the diameter of the head of the fastener; and,
   a drill guide configured to be telescopically nested within the insertion guide, wherein the drill guide has a first end, a second end, and a second sidewall extending between the first end and the second end, the first end of the drill guide having an opening with a third diameter sized and configured to receive a drill bit.

2. The insertion guide assembly of claim 1, wherein the exit end of the insertion guide includes a fastener connector portion having a collet with a plurality of fingers defining the cavity at the exit end of the sidewall, the fingers being constructed of a spring-like material configured to be movable outwardly from a resting position to an expanded position such that the cavity has a third cross sectional distance greater than the diameter of the head of the fastener, and configured to be movable inwardly from the expanded position to the resting position.

3. The insertion guide assembly of claim 2, wherein the plurality of fingers of the exit end of the sidewall includes a first finger and a second finger, the first finger having a first side and a second side, the second finger having a third side and a fourth side, the first side of the first finger and the fourth side of the second finger defining a slot.

4. The insertion guide assembly of claim 2, wherein the exit end of the insertion guide includes a fastener connector portion cavity, the plurality of fingers of the fastener connector portion of the sidewall includes a first finger, a second finger, and a third finger positioned around the fastener connector portion cavity, the fastener connector portion cavity having the first cross sectional distance and the second cross sectional distance.

5. The insertion guide assembly of claim 4, wherein the second cross sectional distance is defined by the sidewall when the fingers are in the resting position.

6. The insertion guide assembly of claim 1, wherein the second sidewall of the drill guide has a tip extending from the second end towards the first end, the second end of the drill guide having a second opening substantially similar to the third diameter sized and configured to permit the drill bit to exit the second sidewall, a first thickness of the second sidewall in the tip is less than a second thickness of the second sidewall adjacent to the tip.

7. The insertion guide assembly of claim 1, wherein the drill guide is configured to removably lock in the insertion guide.

8. The insertion guide assembly of claim 7, wherein the second sidewall of the drill guide includes at least one protrusion configured to mate with a corresponding recess on the sidewall of the insertion guide.

9. The insertion guide assembly of claim 8, wherein the first end of the drill guide includes a plurality of tabs and the second sidewall of the drill guide includes a plurality of slots extending from the first end towards the second end, the second sidewall being constructed of a material configured to bias the plurality of tabs apart.

10. The insertion guide assembly of claim 1, wherein the exit end of the sidewall is configured to be a tapered end.

11. The insertion guide assembly of claim 1, wherein the insertion guide includes a handle positioned at the entrance end of the insertion guide.

12. A method of making an insertion guide assembly, comprising:
   forming a sidewall having an entrance end, and an exit end, and a cavity defined by an interior surface of the sidewall extending from the entrance end to the exit end, the sidewall at the entrance end sized and configured to have a first cross-sectional distance greater than a diameter of a head of a fastener, the sidewall at the exit end having a second cross-sectional distance less than the diameter of the head of the fastener, an exterior surface of the sidewall spaced outwardly from the interior surface, the interior surface of the sidewall having at least one recess configured to mate with a corresponding protrusion on a drill guide; and
   inserting the drill guide into the cavity of the insertion guide such that the drill guide is telescopically nested within the insertion guide, wherein the drill guide has a first end, a second end, and a second sidewall extending between the first end and the second end, the first end of the drill guide having an opening with a third diameter sized and configured to receive a drill bit.

13. The method of claim 12, further comprising forming the sidewall of the exit end as a collet having a plurality of fingers defining the cavity at the exit end of the sidewall, the fingers being constructed of a spring-like material to be movable outwardly from a resting position to an expanded position, and movable inwardly from the expanded position to the resting position.

14. The method of claim 13, further comprising forming the plurality of fingers of the sidewall with a first finger and a second finger, the first finger having a first side and a second side, the second finger having a third side and a fourth side, the first side of the first finger and the fourth side of the second finger defining a slot.

15. The method of claim 13, further comprising forming the cavity to include a fastener connector portion cavity located at the exit end of the sidewall, the plurality of fingers includes a first finger, a second finger, and a third finger positioned around the fastener connector portion cavity, the fastener connector portion cavity having the first cross-sectional distance and the second cross-sectional distance.

16. The method of claim 13, further comprising forming the exit end of the sidewall to articulate within a fastener hole of a reconstruction plate.

17. The method of claim 16, further comprising forming the sidewall at the exit end of the insertion guide to include a protrusion configured to decrease the first cross-sectional distance across the cavity at the protrusion, the protrusion having a proximal end, a distal end, and a length extending between the proximal end and the distal end, wherein the length is less than a length of a shaft of the fastener.

18. The method of claim 12, further comprising forming the sidewall to have a first thickness extending between the interior surface and the exterior surface at the entrance end, and a second thickness extending between the interior surface and the exterior surface in at the exit end of the sidewall, the second thickness being greater than the first thickness.

19. A method, comprising:
  inserting a drill guide into a cavity of an insertion guide;
  placing the insertion guide through an incision within a patient until an exit end of the insertion guide is positioned adjacent to a bone of the patient;
  inserting a drill bit into an opening at a first end of the drill guide, the drill bit extending through a cavity of the drill guide and through an opening in a second end of the drill guide;
  drilling a pilot hole in the bone of the patient using the drill bit;
  removing the drill bit from the drill guide;
  removing the drill guide from the insertion guide;
  inserting a fastener into the cavity of the insertion guide;
  inserting a surgical screwdriver into the cavity of the insertion guide until the surgical screwdriver engages a head of the fastener;
  applying force, with the surgical screwdriver, to the fastener such that a shaft of the fastener is inserted into the bone until the head of the fastener engages a protrusion on a sidewall of the insertion guide;
  applying a removal force to a handle of the insertion guide to release the fastener from the insertion guide; and
  inserting, with the surgical screwdriver, the shaft of the fastener into the bone such that the head of the fastener engages with the bone.

20. An insertion guide assembly for guiding fasteners one at a time into bone, the insertion guide assembly comprising:
  an insertion guide having a sidewall extending between an entrance end and an exit end, and a cavity extending from the entrance end to the exit end, the cavity at the entrance end having a first cross sectional distance greater than a diameter of a head of a fastener, the sidewall at exit end having a second cross sectional distance less than the diameter of the head of the fastener, wherein the sidewall at the exit end of the insertion guide includes a protrusion configured to decrease cross sectional diameter distance across the cavity at the protrusion, the protrusion having a proximal end, a distal end, and a length extending between the proximal end and the distal end, wherein the length is less than a length of a shaft of the fastener; and
  a drill guide configured to be telescopically nested within the insertion guide.

* * * * *